United States Patent [19]
Rossin et al.

[11] Patent Number: 5,862,066
[45] Date of Patent: Jan. 19, 1999

[54] METHODS AND APPARATUS FOR FAST CHECK OF FLOATING POINT ZERO OR NEGATIVE ZERO

[75] Inventors: Theodore G. Rossin; Jon L Ashburn; James M Dewey, all of Fort Collins, Colo.

[73] Assignee: Hewlett-Packard Company, Palo Alto, Calif.

[21] Appl. No.: 846,823

[22] Filed: May 1, 1997

[51] Int. Cl.$^6$ .................................................. G06F 7/52
[52] U.S. Cl. ................................ 364/736.5; 364/748.1
[58] Field of Search .......................... 364/736.5, 748.1, 364/761

[56] References Cited

U.S. PATENT DOCUMENTS

| | | | |
|---|---|---|---|
| 4,878,189 | 10/1989 | Kawada | 364/736.5 |
| 4,961,161 | 10/1990 | Kojima | 364/736.5 |
| 5,561,619 | 10/1996 | Watanabe et al. | 364/736.5 |
| 5,638,312 | 6/1997 | Simone | 364/736.5 |

*Primary Examiner*—David H. Malzahn

[57] ABSTRACT

Apparatus for performing floating point divide operations includes a divider and a comparator. The divider performs a floating point divide operation on a floating point numerator and a floating point denominator. The comparator performs a comparison of the floating point denominator, except for a sign bit of the floating point denominator, with a floating point value of 0.0. A logic element, responsive to a control signal indicative of the floating point divide operation, provides to the comparator equal sign bits associated with the floating point denominator and the floating point value of 0.0. A result of the comparison indicates a divide by zero operation and is independent of the sign of the floating point denominator. The result of the comparison is used to determine a course of action before the divide operation is completed.

14 Claims, 3 Drawing Sheets

METHODS AND APPARATUS FOR FAST CHECK OF FLOATING POINT ZERO OR NEGATIVE ZERO

FIELD OF THE INVENTION

The present invention relates to methods and apparatus for processing floating point numbers. More particularly, the present invention relates to methods and apparatus for efficiently detecting a divide by zero or negative zero condition.

BACKGROUND OF THE INVENTION

Floating point numbers are often used when precision is required in performing computations using very large or very small numbers. In the floating point number system, the exponent of a number is scaled up or down as the decimal point is shifted. For example, the speed of light can be represented as $3.00 \times 10^8$ m/s or $0.3 \times 10^9$ m/s or $30.0 \times 10^7$ m/s. The exponent is scaled up as the decimal point is shifted left, and the exponent is scaled down as the decimal point is shifted right.

Many computers provide the means, either in software or hardware, to process numbers in floating point or "scientific" notation (as contrasted to fixed point). In this format, the computer word (or, often, a group of several words) is divided into bit groups or fields:

| Sign | EXPONENT | FRACTION (or mantissa) |

This format represents the value defined by: (sign)$(2^{EXPONENT}) \cdot$(FRACTION). Floating point values may have 8 digits of precision in the mantissa and 2 or 3 digits of precision on the exponent. This is an IEEE standard bit format for normalized floating point representation. In some machines, the "2" in the above representation is replaced by "16," which amounts to a scaling of the exponent. Both the exponent and fraction are signed: the exponent field carries its own sign, and the explicit sign bit (the leftmost bit of the entire floating point representation) belongs to the fraction. For 32-bit floating point representation, the exponent is typically 8 bits, and the fraction, or mantissa, is typically 23 bits.

Negative zero may result from subtraction of very large numbers. Negative zero refers to a very small negative number. The sign bit is negative to represent the sign of the number, but the fraction field is zero. Similarly, a fraction field of zero with a positive sign bit may represent zero or a very small positive number. When a floating point number with a fraction field of zero and either a positive or negative sign is used as the denominator in a divide operation, a divide by zero error, or exception, occurs.

Avoiding a divide by zero error is essential to efficient, rapid operation of a wide variety of computer and computer-related systems. When performing divide operations with a pipelined divider, it is desirable to detect a divide by zero condition before the divider operation has completed and generated an error. Prior approaches have included waiting for the divide operation to complete and then flushing and restarting the pipeline with very complex error handler logic and/or software. Prior approaches have also included performing two compare operations in series, including one compare to check for a positive zero and one compare to check for a negative zero. However, if two separate compare operations are required to check for positive and negative zeroes, there may not be enough time to detect the divide by zero and take corrective action before the divide operation has completed.

One example of a system in which speed is essential in performing large numbers of calculations is a computer graphics system. Generally, floating point numbers are used to represent values for the vertices in three-dimensional space, for example, in x, y, and z coordinates. The computer graphics systems are commonly used for displaying graphical representations of objects on a two-dimensional display screen. Current computer graphics systems can provide highly detailed representations and are used in a variety of applications.

The basic components of a typical computer graphics system include a geometry accelerator, a rasterizer and a frame buffer. The system also may include other hardware such as texture mapping hardware. In typical computer graphics systems, an object to be represented on a display screen is broken down into a plurality of graphics primitives. Primitives, such as points, lines, vectors and polygons (e.g., triangles), are basic components of a graphics picture. Typically, a hardware/software scheme is implemented to render (draw) on a two-dimensional display screen, the graphics primitives that comprise a view of one or more objects. The geometry accelerator receives, from the host computer, vertex coordinate and color data for primitives that constitute an object to be rendered. When the primitive is a triangle, for example, the host computer may define the triangle in terms of the x, y, z coordinates and the red, green, blue (R, G, B) color values of each vertex. The geometry accelerator typically performs transformations on the vertex coordinate data (i.e., to screen space coordinates), decomposes quadrilaterals into triangles, and may perform other functions, such as lighting, clipping and performing plane equation calculations, for each primitive. The output from the geometry accelerator, referred to as rendering data, is used by the rasterizer (and optional texture mapping hardware) to compute final screen space coordinates and R, G, B color values for each pixel constituting the primitives. The pixel data is stored in the frame buffer for display on a display screen. Some graphics systems are pipelined such that various operations (such as transformations, interpolation, etc.) are performed simultaneously by different components on different object primitives.

The operations of the geometry accelerator are highly computation intensive. One frame of a 3-D graphics display may include on the order of hundreds of thousands of primitives. To achieve state of the art performance, the geometry accelerator may be required to perform on the order of hundreds of millions of floating point calculations per second per chip. Furthermore, the volume of data transferred between the host computer and the graphics hardware is very large. The data for a single quadrilateral may be on the order of 64 words of 32 bits each. Additional data transmitted from the host computer to the geometry accelerator includes lighting parameters, clipping parameters and any other parameters needed to generate the graphics display.

Functions of the geometry accelerator may include three-dimensional transformation, lighting, clipping, and perspective divide operations as well as plane equation generation, performed in floating point format. Geometry accelerator functions result in rendering data which is sent to the frame buffer subsystem for rasterization.

Various techniques have been employed to improve the performance of geometry accelerators, including pipelining and multiprocessing. Nonetheless, the need exists for additional improvements in performance. In particular, the need exists for increasing the efficiency of computations by the geometry accelerator.

SUMMARY OF THE INVENTION

According to one aspect of the invention, apparatus for performing floating point divide operations is provided. The apparatus comprises a divider receiving a floating point numerator and a floating point denominator, and performing a floating point divide operation on the floating point numerator and the floating point denominator and a comparator receiving a floating point value of 0.0 and the floating point denominator, and performing a comparison of the floating point value of 0.0 and the floating point denominator, except for the sign bit of the floating point denominator. The apparatus further comprises a logic element, responsive to a control signal indicative of the floating point divide operation, for providing to the comparator sign bits associated with the floating point denominator and the floating point value of 0.0. A result of the comparison is indicative of a divide by zero operation and is independent of the sign of the floating point denominator.

The apparatus may further comprise a storage device, such as a register file, for providing the floating point numerator and the floating point denominator to the divider, and for providing the floating point value of 0.0 and the floating point denominator to the comparator. A first register may be coupled between the register file and the comparator for holding the floating point value of 0.0. A second register may be coupled between the register file and the comparator for holding the floating point denominator, except for the sign bit of the floating point denominator. The logic element may comprise an AND gate receiving the control signal at a first input and the sign bit of the floating point denominator at a second input.

According to another aspect of the invention, a method for performing floating point divide operations is provided. A floating point numerator and a floating point denominator are supplied to a hardware divider. A floating point divide operation is performed on the floating point numerator and the floating point denominator with the hardware divider. A floating point value of 0.0 and the floating denominator, except for a sign bit of the floating point denominator, are supplied to a hardware comparator. The sign bit of the floating point denominator is made equal to the sign bit (typically positive) of the floating point value of 0.0. A comparison of the floating point value of 0.0 and the floating point denominator, with equal sign bits, is performed. A result of the comparison is indicative of a divide by zero operation and is independent of the sign of the floating point denominator. The invention permits a divide by zero condition to be detected quickly and with minimum circuitry.

BRIEF DESCRIPTION OF THE DRAWINGS

The present invention will be better understood from the following detailed description of the invention with reference to the following drawings, in which.

DETAILED DESCRIPTION

Figure 1:
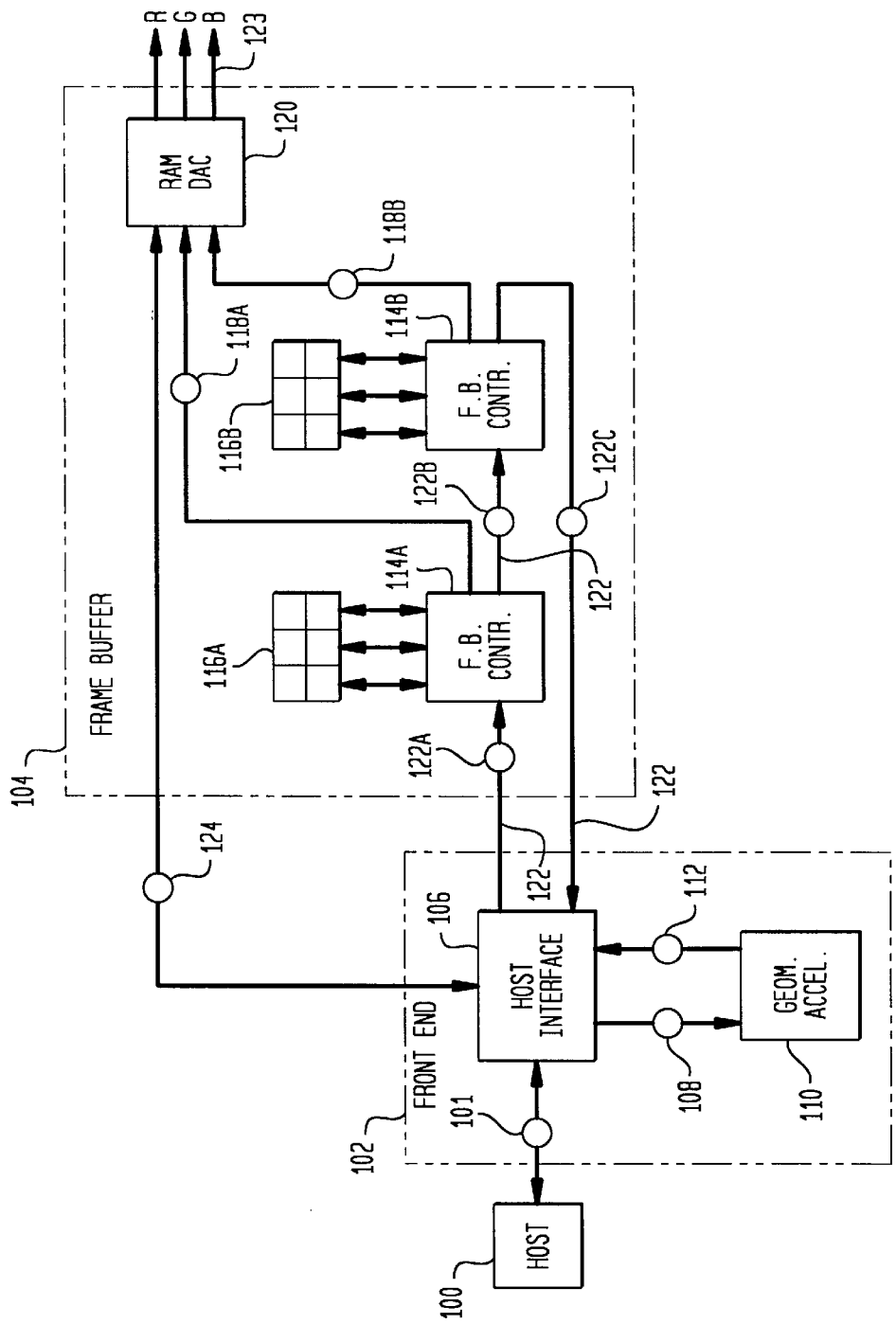
FIG. 1 is a block diagram showing an exemplary embodiment of a computer graphics system suitable for practice of the present invention.

FIG. 1 is a block diagram showing an exemplary embodiment of a computer graphics system suitable for practice of the present invention. It should be understood that the system is exemplary and in no way limiting and that any computer graphics system may utilize the methods and apparatus of the present invention. Furthermore, as discussed below, the invention is not limited to application in computer graphics systems.

The system of FIG. 1 includes a host computer 100, a front end subsystem 102 and a frame buffer subsystem 104. The front end subsystem 102 receives primitives to be rendered from the host computer 100 over bus 101. The primitives typically are specified by x, y, z coordinate data, R, G, B color data, Nx, Ny, Nz normal data and alpha blending data, for each of certain portions of the primitives, such as the triangle vertices.

Data representing the primitives in three dimensions is provided by the front end subsystem 102 to the frame buffer subsystem over bus 122, having segments 122A, 122B and 122C. The frame buffer subsystem 104 interpolates the rendering data received from the front end subsystem 102 to compute the pixels on the display screen that will represent each primitive, and to determine resulting object R, G, B color values for each pixel. R, G, B color control signals for each pixel respectively are provided over R, G, B lines 123 to control the pixels of the display screen (not shown) to display a resulting image thereon.

In the embodiment shown in FIG. 1, front end subsystem 102 includes a host interface 106 and a three-dimensional (3-D) geometry accelerator 110. As noted, host interface 106 receives the x, y, z coordinates and color primitive data along bus 101 from host computer 100. Such data is provided from host interface 106 to geometry accelerator 110 along bus 108. Geometry accelerator 110 performs conventional geometry accelerator functions resulting in rendering data for display. Such functions may include three-dimensional transformation, lighting, clipping, and perspective divide operations, as well as plane equation generation, done in floating point format. The rendering data is provided by geometry accelerator 110 along bus 112 to host interface 106 which re-formats the rendering data, performs a floating point to fixed point conversion, and provides such data along bus system 122 to frame buffer subsystem 104.

In this embodiment, frame buffer subsystem 104 includes two frame buffer controllers 114A and 114B, each having a respective serial synchronous graphics random access memory (SGRAM) 116A and 116B, as well as a random access memory digital-to-analog converter (RAMDAC) 120. Connected to the bus architecture 122 of the present invention are both frame buffer controllers 114A and 114B and host interface 106. In this embodiment, bus 122 includes three buses 122A, 122B and 122C, each identical to the other.

In the embodiment of FIG. 1, each frame buffer controller 114A and 114B receives rendering data from host interface 106. Each frame buffer controller may control different, non-overlapping segments of the display screen. The frame buffer controllers may interpolate the primitive data to compute the screen display pixel coordinates that represent the primitive, and the corresponding object R, G, B color values for each pixel coordinate.

The resulting image video data generated by the frame buffer controllers 114A and 114B, including R, G, B values for each pixel, may be stored in the corresponding SGRAMs 116A and 116B. Video data may be shifted out serially from the SGRAM chips, re-formatted so that it can be handled by RAMDAC 120, and provided to the RAMDAC. RAMDAC 120, in turn, may convert the digital color data to analog R, G, B color control signals for each pixel, which are provided along R, G, B lines 123 to control a screen display (not shown).

Host interface 106 also may communicate directly with RAMDAC 120 through video bus 124. The system preferably is a pipelined system such that frame buffer subsystem 104 may operate on a first primitive while front end subsystem 102 is operating on a subsequent (in time) primitive.

Figure 2:
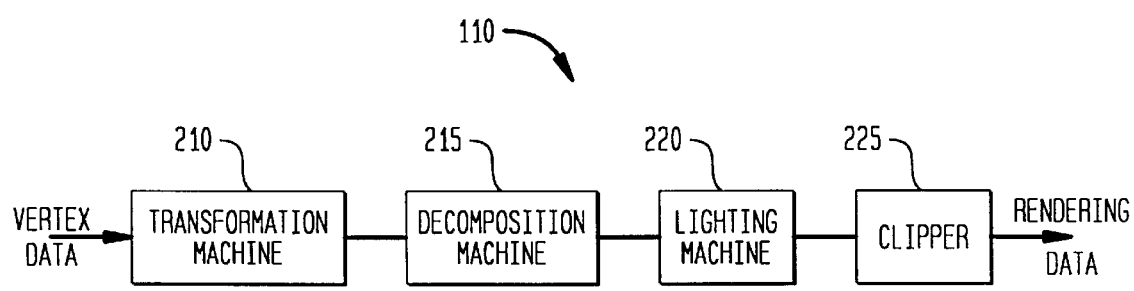
FIG. 2 is a simplified block diagram of a geometry accelerator suitable for practice of the present invention.

FIG. 2 is a highly simplified block diagram of a geometry accelerator 110 in which the present invention may advantageously be implemented. A transformation machine 210 receives definitions of graphic primitives, including x, y, and z coordinates of vertices and R, G and B color values of vertices. The transformation machine 210 transforms the coordinates to display screen space. A decomposition machine 215 decomposes polygons into triangles and other primitives used by the graphics hardware. A lighting machine 220 performs lighting calculations so that the graphics display is illuminated by one or more light sources. A clipper 225 performs clipping calculations with respect to graphics primitives that are partially outside the display screen space. The transformation machine, the decomposition machine 215, the lighting machine 220, and the clipper 225 may be implemented as state machines, which perform required calculations on the vertex data to provide rendering data to the frame buffer 104 (FIG. 1). Many of these calculations may include divide operations as indicated above. Although the details of such calculations are outside the scope of the invention, it is desirable to perform such calculations as rapidly and efficiently as possible.

Figure 3:
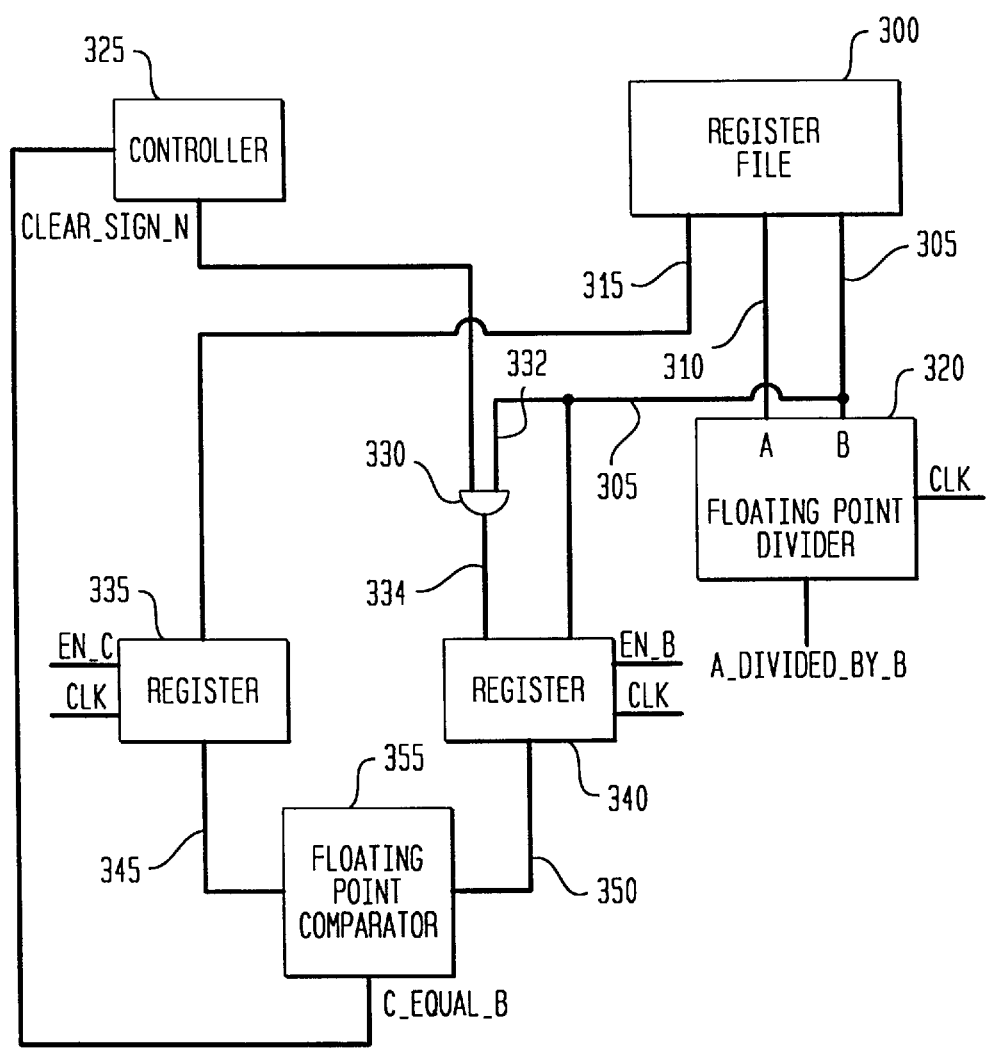
FIG. 3 is a block diagram of an example of apparatus in accordance with the present invention.

FIG. 3 is a block diagram of an example of apparatus in accordance with the present invention for fast checking for divide by floating point zero or negative zero. A multiported register file 300 holds floating point values that have been previously calculated or received from a host computer. The register file 300 also contains a floating point constant 0.0. A floating point divider 320 receives from register file 300 floating point values for a numerator A on bus 310 and a denominator B on bus 305. Register file 300 also provides floating numbers to a register 335 on bus 315 and to a register 340 on bus 305. The outputs of registers 335 and 340 are connected to the inputs of a floating point comparator 355 via buses 345 and 350, respectively. Registers 335 and 340 are used for pipelining and timing reasons and may be omitted in some implementations of the invention. The CLK inputs of register 335 and register 340 are synchronized with the CLK input of divider 320. In the present invention, the floating point constant 0.0 is stored by register 335 and is used by comparator 355 in the check for floating point zero or negative zero.

An AND gate 330 receives at a first input the sign bit of the denominator on a line 332 of bus 305 and receives at a second input a CLEAR_SIGN_N signal from a controller 325. The output of AND gate 330 is passed on line 334 to register 340 as a modified sign bit. In one implementation, the floating point values carried on buses 305, 310, 315, 345 and 350 are 32-bit words, and each bus has 32 lines. The sign bit on line 332 is obtained from the appropriate line of bus 305.

The operation of the apparatus shown in FIG. 3 is now described. When a floating point divide operation is to be performed by divider 320, the CLEAR_SIGN_N signal is set to "0" by controller 325 to indicate the divide operation. A numerator on bus 310 and a denominator on bus 305, both of which are floating point values, are loaded from register file 300 into divider 320 to begin a divide operation. The output of divider 320 is the result A_DIVIDED_BY_B.

Register 335 is loaded with the floating point constant 0.0 from register file 300. The denominator on bus 305, with the exception of the sign bit, is sent to register 340. The sign bit of the denominator on line 332 is sent to AND gate 330. The AND gate 330 also receives the CLEAR_SIGN_N signal (set to "0") from controller 325, to modify the sign bit of the denominator. The output of AND gate 330 on line 334 is sent to an input of register 340 which would normally receive the sign bit of the floating point denominator to be compared. The AND gate 330 controls the sign bit of the denominator supplied to register 340 so that it is the same as the sign bit (typically positive) of the floating point constant 0.0 supplied to register 335. Thus, the result of the comparison is independent of the sign bit of the denominator. The floating point denominator, including the modified sign bit, is then compared by comparator 355 to the floating point constant 0.0 stored in register 335. The C_EQUAL_B output of comparator 355 is asserted when the inputs on buses 345 and 350 are equal, representative of a divide by zero or negative zero condition. The result of the comparison may be sent to controller 325 for responding to the divide by zero condition.

By modifying the sign bit of the denominator, comparator 355 determines if the denominator in the divide operation has a value of zero (or nearly zero), with one compare operation, independent of the sign of the denominator. Setting the CLEAR_SIGN_N signal to "1" allows the comparator 355 to behave normally for other comparison functions which are not related to the fast check for floating point zero or negative zero of the present invention. When the CLEAR_SIGN_N signal is set to "1", the bit on line 332 is simply passed through by AND gate 330 to register 340.

The AND gate 330 permits the system to compare the denominator to 0.0 and to provide the C_EQUAL_B signal when the denominator is zero or nearly zero, regardless of its sign. This invention allows the divide by zero condition to be detected with a single compare, quickly and with minimal logic/software overhead. The divide by zero condition may be detected in a single clock cycle.

When the divide operation begins, the apparatus of the present invention begins a fast check for floating point zero or negative zero. Since a complete divide operation by divider 320 requires several (typically about 8) timing states, the fast check, which is completed in one timing state, provides a result before the divide operation is completed. Controller 325 processes the result of the comparison and then has seven timing states to determine how to resolve the divide by zero condition. Any desired action may be taken to respond to the divide by zero condition. Controller 325 may, for example, use a number stored in the register file 300 or elsewhere to replace the result from the divider 320. Controller 325 may also terminate the divide operation before it is completed and/or may execute an error handling routine.

Typically, the divide operation and the comparison operation are started on the same clock cycle, or timing state. Since the comparison operation requires only a single clock cycle, whereas the divide operation requires several clock cycles, the result of the comparison is available before the divide operation is completed. If the denominator is available, the comparison operation may be started one or more clock cycles before or after the divide operation is started. The result of the comparison operation should be available before the divide operation is completed and itself generates an error.

In the computer graphics example described previously, millions of calculations are required for each frame of a display. Some fraction of those calculations are divide operations. For example, the clipping calculations performed by the geometry accelerator require calculations of ratios. The present invention increases the overall speed of the geometry accelerator calculations by detecting a divide by zero condition with only one compare operation. Because the divide by zero condition is detected quickly and before the divide operation completes, appropriate steps can be taken without resorting to the elaborate error recovery mechanisms used in prior art systems. The increased calculation speed produces better quality graphics.

It will be understood that the present invention is not limited to application in computer graphics systems. More generally, the invention may be utilized in microprocessors and in other digital systems which utilize a floating point divider, and which are required to detect a divide by zero condition.

Numerous variations are included within the scope of the present invention. For example, with reference to FIG. 3, the floating point numerator, the floating point denominator, and the floating point value of 0.0 may be provided to divider 320 and registers 335 and 340 from any suitable register, memory device or other storage device or data source. Furthermore, the registers 335 and 340 may be omitted when they are not required by timing or other considerations. In addition, the AND gate 330 may be replaced by other suitable logic elements. The requirement of AND gate 330 or another logic element is to modify the sign bit of the denominator provided to one input of comparator 355 so that it is equal to the sign bit of the floating point value of 0.0 provided to the other input of comparator 355. Typically, the floating point value of 0.0 has a positive sign bit, and the sign bit of the denominator is modified to positive, regardless of its state. However, it will be understood that negative sign bits can be associated with the floating point value of 0.0 and with the denominator. When the sign bits are equal, the result of the comparison is independent of the sign bit. The CLEAR_SIGN_N signal is asserted during a divide operation. At other times, the CLEAR_SIGN_N signal is typically deasserted, and the floating point comparator 355 may perform comparisons without modification of the sign bit.

Having thus described at least one illustrative embodiment of the invention, various alternations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. Apparatus for performing floating point divide operations, comprising:

a divider receiving a floating point numerator and a floating point denominator, each having a sign bit, and performing a floating point divide operation on said floating point numerator and said floating point denominator;

a comparator receiving a floating point value of 0.0 having a sign bit and a modified floating point denominator, and performing a comparison of said floating point value of 0.0 and said modified floating point denominator, said modified floating point denominator comprising said floating point denominator having a modified sign bit, said modified sign bit being equal to the sign bit of said floating point value of 0.0; and a logic element, responsive to a control signal indicative of said floating point divide operation, for providing said modified sign bit, wherein a result of said comparison is indicative of a divide by zero operation and is independent of the sign of said floating point denominator.

2. Apparatus as defined in claim 1 wherein said logic element comprises an AND gate receiving said control signal at a first input and the sign bit of said floating point denominator at a second input, and providing an output representative of a positive sign to said comparator.

3. Apparatus as defined in claim 2 further comprising a register file containing said floating point numerator, said floating point denominator and said floating point value of 0.0, a first register coupled between said register file and said comparator for receiving and holding said floating point value of 0.0 and a second register coupled between said register file and said comparator and having an input coupled to said logic element for receiving and holding said modified floating point denominator.

4. Apparatus as defined in claim 1 further comprising a storage device containing said floating point numerator, said floating point denominator and said floating point value of 0.0.

5. Apparatus as defined in claim 4 wherein said storage device comprises a register file.

6. A method for performing floating point divide operations, comprising the steps of:

supplying a floating point numerator and a floating point denominator to a hardware divider;

performing a floating point divide operation on said floating point numerator and said floating point denominator with said hardware divider;

supplying a floating point value of 0.0 having a sign bit and a modified floating point denominator to a hardware comparator, said modified floating point denominator comprising said floating point denominator having a modified sign bit, said modified sign bit being equal to the sign bit of said floating point value of 0.0; and performing a comparison of said floating point value of 0.0 and said modified floating point denominator, wherein a result of said comparison is indicative of a divide by zero operation and is independent of the sign of said floating point denominator.

7. A method as defined in claim 6 wherein the step of supplying a modified floating point denominator includes providing an input to said comparator representative of a positive sign of said floating point denominator.

8. A method as defined in claim 6 further including the steps of holding said floating point value of 0.0 in a first register and holding said modified floating point denominator in a second register during the step of performing a comparison.

9. A method as defined in claim 6 further including the step of storing said floating point numerator, said floating point denominator, and said floating point value of 0.0 in a register file, wherein said floating point numerator and said floating point denominator are supplied from said register file to said hardware divider for performing said floating point divide operation, and said floating value of 0.0 is supplied from said register file to said hardware comparator for performing said comparison.

10. Apparatus for performing floating point divide operations, comprising:

a storage device containing a floating point numerator, a floating point denominator and a floating point value of 0.0, each having a sign bit;

a divider receiving said floating point numerator and said floating point denominator, and performing a floating point divide operation on said floating point numerator and said floating point denominator;

a first register coupled to said register file for receiving and holding said floating point value of 0.0;

a second register coupled to said register file for receiving and holding a modified floating point denominator, said modified floating point denominator comprising said floating point denominator having a modified sign bit, said modified sign bit being equal to the sign bit of said floating point value of 0.0;

a comparator for receiving said floating point value of 0.0 from said first register and said modified floating point denominator from said second register, and performing a comparison of said floating point value of 0.0 and said modified floating point denominator; and a logic element, responsive to a control signal indicative of said floating point divide operation, for providing said modified sign bit to said second register, wherein a result of said comparison is indicative of a divide by zero operation and is independent of the sign of said floating point denominator.

11. In a computer graphics system, apparatus for performing floating point divide operations, comprising:

a storage device containing a floating point numerator, a floating point denominator and a floating point value of 0.0, each having a sign bit;

a divider receiving said floating point numerator and said floating point denominator from said storage device, and performing a floating point divide operation on said floating point numerator and said floating point denominator;

a comparator receiving said floating point value of 0.0 from said storage device and a modified floating point denominator, and performing a comparison of said floating point value of 0.0 and said modified floating point denominator, said modified floating point denominator comprising said floating point denominator having a modified sign bit, said modified sign bit being equal to the sign bit of said floating point value of 0.0; and a logic element, responsive to a control signal indicative of said floating point divide operation, for providing said modified sign bit, wherein a result of said comparison is indicative of a divide by zero operation and is independent of the sign of said floating point denominator.

12. Apparatus as defined in claim 11, wherein said logic element comprises an AND gate receiving said control signal at a first input and the sign bit of said floating point denominator at a second input, and providing an output representative of a positive sign to said comparator.

13. Apparatus as defined in claim 12 further comprising a first register coupled between said storage device and said comparator for holding said floating point value of 0.0, and a second register coupled between said storage device and said comparator for holding said modified floating point denominator.

14. Apparatus as defined in claim 13 wherein said storage device comprises a multiport register file.

* * * * *

UNITED STATES PATENT AND TRADEMARK OFFICE
CERTIFICATE OF CORRECTION

PATENT NO.   : 5,862,066
DATED        : January 19, 1999
INVENTOR(S)  : Theodore G. Rossin et al.

It is certified that error appears in the above-identified patent and that said Letters Patent is hereby corrected as shown below:

Column 3,
Line 16, after "comparator" insert -- equal --

Signed and Sealed this

Eleventh Day of June, 2002

Attest:

JAMES E. ROGAN
Attesting Officer    Director of the United States Patent and Trademark Office